Aug. 4, 1964  P. G. HJERTBERG ETAL  3,143,687
RELAY PROTECTION FOR CAPACITOR BANKS
Filed April 18, 1957
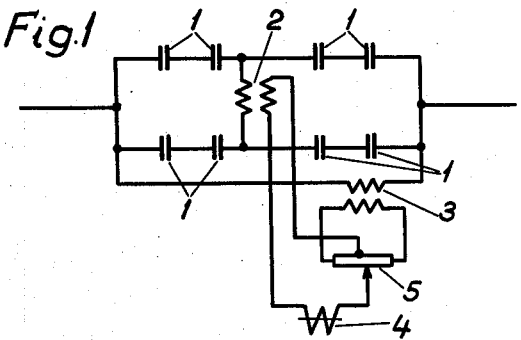
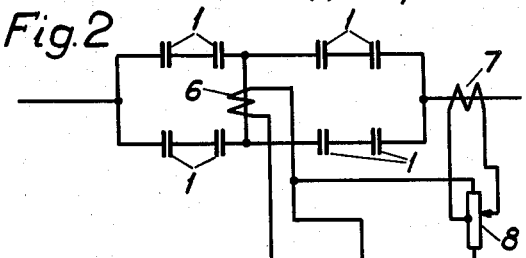
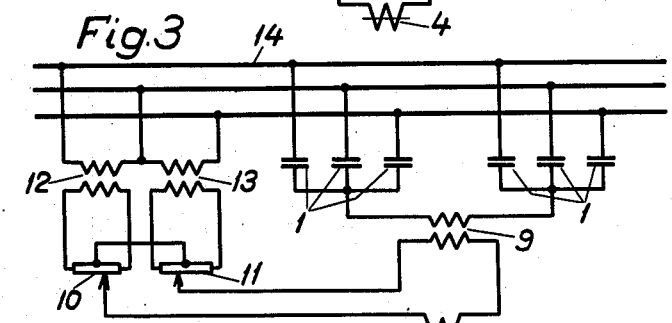
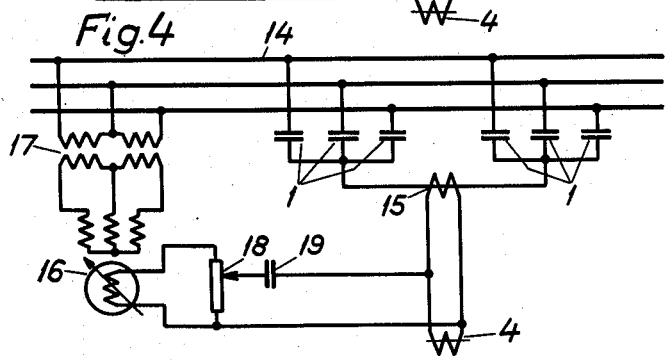
INVENTOR.
Peter Gustav Hjertberg and
Paul Skogby.
BY
Attorney.

United States Patent Office 3,143,687
Patented Aug. 4, 1964

3,143,687
RELAY PROTECTION FOR CAPACITOR BANKS
Peter Gustav Hjertberg and Paul Skogby, Vasteras, Sweden, assignors to Allmanna Svenska Elektriska Aktiebolaget, Vasteras, Sweden, a corporation of Sweden
Filed Apr. 18, 1957, Ser. No. 653,637
Claims priority, application Sweden Apr. 30, 1956
7 Claims. (Cl. 317—12)

The present invention relates to a relay protection for capacitor banks connected to alternating current networks.

Relay protections for large capacitor banks generally consist of a relay affected by an alternating current quantity dependent on the symmetry of the capacitor bank. Generally this alternating current quantity is supplied by a measuring transformer, which is connected between two at faultless bank equipotential points, or which measures the difference between the voltages over or the currents through two separate, generally equivalent sections of the bank. In the event of failure on a capacitor element or unit the symmetry of the bank is disturbed so that the alternating current quantity affecting the relay diverges from zero and the relay picks up. This type of relay protection is however impaired by a certain zero error as even a faultless capacitor bank normally is dissymmetrical to a certain degree due to the fact that the capacitance of the capacitor elements varies within the manufacturing tolerance. This initial dissymmetry puts of course a limit for the sensitivity of the relay protection and if no special precautions are taken, this initial dissymmetry may become considerably larger than the permissible dissymmetry due to a fault. In order to decrease the zero errors as far as possible one has heretofore tried to arrange a symmetrical capacitor bank guided by the measured capacitance values of the capacitor elements. This is however often a very tedious work and this initial matching is further generally entirely spoiled if a capacitor element is to be replaced or if its capacitance value is changed.

The object of the present invention is to provide a relay protection for a capacitor bank connected to an alternating current network, which protection does not require any special matching of the bank, but in which the zero error caused by the normal dissymmetry of the faultless bank is electrically compensated so that a sensitive protection is achieved. According to the invention this is done by supplying the relay of the protection with two alternating current quantities, one of them being derived from the capacitor bank and dependent on the dissymmetry of the bank, and the other one being a compensating quantity which at faultless capacitor bank compensates the alternating current quantity caused by the normal dissymmetry of the bank. The total quantity affecting the relay is consequently always zero so long as the capacitor bank is faultless, in consequence of which a relay with low operating value may be used, and further the pick up value of the protection will be independent of the phase angle that the alternating current quantity dependent on the dissymmetry of the bank, gets upon failure.

The alternating current quantity caused by the normal dissymmetry of the faultless capacitor bank is however dependent on the conditions of the network so that its magnitude and phase vary with the magnitude and phase of the tension and the current of the alternating current network. According to the invention the compensating quantity is therefore derived from the network in such a way that its magnitude and phase is correspondently dependent on the magnitude and phase of the service quantities of the network.

Further the magnitude and phase of the alternating current quantity caused by the normal dissymmetry of course varies from one capacitor bank to another, and they are normally also changed when a capacitor element of the bank is replaced. The relay protection according to the invention may therefore suitably be provided with means for adjustment of the magnitude and the phase of the compensating quantity. At single-phase capacitor banks the zero error however can normally only have a certain fixed phase or the opposite one, wherefore in this case only means for adjustment of the magnitude and the polarity of the compensating quantity are necessary.

The practical arrangement of the relay protection according to the invention may be varied within wide limits dependent on whether the relay protection is intended for a shunt or series capacitor bank, a single-phase or multiphase bank, and how the alternating current quantity dependent on the dissymmetry of the capacitor bank, is derived from the bank. The invention is consequently not limited to those embodiments which by way of example are shown in the accompanying drawings and described below.

In the accompanying drawings, FIG. 1 shows a relay protection for a single-phase capacitor bank, where the compensating quantity is derived from a voltage transformer connected in parallel with a capacitor bank, FIG. 2 shows a relay protection for a single-phase capacitor bank, where the compensating quantity is derived from a current transformer connected in series with the bank. FIG. 3 shows a relay protection for a three-phase shunt capacitor bank, where the compensating quantity is derived from two voltages dividers connected to two separate line voltages of the three-phase network, and FIG. 4 shows a relay protection for a three-phase shunt capacitor bank, where the compensating quantity is derived from an induction regulator.

In FIG. 1 a single-phase series or shunt capacitor bank is shown, which consists of capacitor elements or groups of capacitor elements 1, which are connected in two parallel branches. The relay protection consists of a voltage transformer 2, a voltage transformer 3, a relay 4 and a voltage divider 5. The voltage transformer 2 is connected between two normally equipotential points of the two parallel branches. The voltage transformer 3 is connected in parallel with the capacitor bank and its secondary winding is connected to the voltage divider 5. The relay 4 is connected to the voltage derived from the voltage transformer 2 in series with the voltage between a center terminal and the movable terminal of the voltage divider 5. Evidently the voltage from the voltage transformer 2 depends on the dissymetrry of the capacitor bank, and in the event of failure of a capacitor element or unit the system becomes out of balance so that a voltage arises over the transformer 2 and the relay 4 picks up. At faultless bank there exists over the transformer 2 only the zero error voltage, which is caused by the normal dissymmetry of the bank, and this voltage may easily be compensated by a part of the voltage from the transformer 3 so that no resulting voltage affects the relay at faultless bank. As the voltage over the transformer 2 always is in phase or in opposite phase with the voltage over the capacitor bank and consequently over the transformer 3, no special device for adjustment of the phase of the compensating voltage is necessary, but the necessary compensating voltage may be procured by means of the voltage divider 5 alone. It may further be observed that the zero error voltage from the transformer 2 depends on the voltage drop over the capacitor bank, but as this also applies to the compensating voltage from the transformer 3 the resulting voltage over the relay 4 will always be zero at faultless capacitor bank independent of the condition of the network. The primary winding of the voltage transformer 3 consists suitably of the discharging reactor of the capacitor bank.

FIG. 2 shows a single-phase capacitor bank arranged in the same manner as the bank shown in FIG. 1. In this case however, the quantity dependent on the dissymmetry of the bank, is derived from a current transformer 6 connected between two normally equipotential points on the two parallel branches of the bank. The compensating quantity is derived from a current transformer 7, which is connected in series with the capacitor bank, and the secondary winding of which is connected to a centre terminal and the movable terminal of the voltage divider 8. The relay 4 which in this case is an alternating current relay is connected to the secondary winding of the transformer 6 in parallel with the voltage divider 8. Also in this arrangement the zero error current from the transformer 6 and the current from the transformer 7 will be in phase or in opposite phase with one another, in consequence of which it is always possible by means of the voltage divider 8 to compensate the zero error current so that the resulting current through the relay 4 is zero at faultless capacitor bank.

The compensating quantity may of course be supplied by a voltage transformer at the same time as the quantity dependent on the dissymmetry of the capacitor bank, is supplied by a current transformer, or vice versa. In this case however, the two quantities will be of different nature and further be 90° out of phase. Consequently one of them has to be transformed from voltage into current, or vice versa, and 90° phase displaced. This however, may easily be done by means of a capacitor connected in parallel or in series with the quantity.

The arrangement for supplying the compensating quantities shown in FIGS. 1 and 2 may be used at all single-phase capacitor banks independent of the manner in which the quantity dependent on the dissymmetry of the bank, is procured. This quantity may for example be derived from a measuring transformer, which measures the difference between the currents in the two parallel branches or between the voltages over two series connected groups of capacitor elements.

The embodiments of the invention shown in FIGS. 1 and 2 are however only usable for single-phase capacitor banks. If they are to be used in a multiphase bank, one relay protection is necessary for each phase of the bank. It is however, also possible to apply the invention to a relay protection, protecting a multiphase capacitor bank.

FIG. 3 shows such an embodiment. In this arrangement the capacitor bank consists of two star-connected three-phase systems of capacitor elements, which are connected to the three-phase network 14. The alternating current quantity dependent on the dissymmetry of the bank, is supplied by a voltage transformer 9 connected between the neutral points of the three-phase systems. As in this case the zero error voltage can have any arbitrary phase, means must be provided for adjustment of the phase as well as the magnitude of the compensating quantity. This is done by supplying the compensating quantity to the relay from the movable terminals of two voltage dividers 10 and 11, which through the voltage transformers 12 and 13 are connected to one line voltage each of the network 14. The voltage dividers are provided with centre terminals which are connected with one another, in consequence of which the voltage between the movable terminals may be given any arbitrary magnitude and phase. Instead of interconnecting the centre terminals of the voltage dividers 10 and 11 the same result may be obtained by connecting the centre points of the secondary windings of the voltage transformers 12 and 13 with one another. In order to decrease the impedance of the arrangement, which impedance is connected in series with the relay circuit, the centre points of the voltage dividers as well as of the secondary windings may be connected with one another. The voltage dividers consist suitably of variable auto-transformers so that the power consumption of the arrangement becomes as small as possible. The voltages from the voltage transformers 12 and 13 are however often used for other purposes in which case it is generally not possible to connect the centre points of the voltage transformers with one another as described above. If the voltage dividers consist of auto-transformers this problem however may be solved by providing the auto-transformers with centre terminals which are connected with one another and by feeding the auto-transformers from the voltage transformers 12 and 13 between these centre terminals and one of the end terminals of each auto-transformer.

By means of the arrangements described above it is not possible to adjust the magnitude and the phase of the compensating quantity independent of one another, but it is necessary to make adjustments on the two voltage dividers alternately. The adjustment is however definite and converges rapidly. As the voltage dividers are connected to all phases of the network the compensating voltage is distinctly dependent on the conditions of the network in the same manner as the zero error voltage, because of which the resulting voltage over the relay 4 always is zero at faultless bank independent of the condition of the network.

FIG. 4 shows another form of a relay protection according to the invention for a multiphase shunt capacitor bank. As in FIG. 3, the bank consists of two star-connected three-phase systems of capacitor elements 1. The alternating current quantity dependent on the dissymmetry of the bank, is derived from a current transformer connected between the neutral points of the two three-phase systems. At this arrangement the compensating quantity is derived from a voltage divider 18 which is connected to the single-phase secondary winding of an induction regulator having the form of an asynchronous machine 16 with blocked motor, the three-phase primary winding of which is connected to the network 14 through voltage transformers 17. The asynchronous machine 16 operates in the same manner as an induction regulator so that the compensating quantity can by turning of the rotor of the machine be given any phase desired, while its magnitude can be adjusted by means of the voltage divider 18. At this arrangement the adjustments of the phase and the magnitude of the compensating quantity consequently are entirely independent of one another. As the quantity dependent on the dissymmetry of the bank, is a current derived from the current transformer 15, and as the relay 4 is supposed to be an alternating current relay, the compensating quantity also has to have the characteristics of an alternating current. The voltage from the voltage divider 18 is therefore connected in series with a capacitor 19. The compensating quantity becomes thereby 90° phase displaced, but as any arbitrary phase may be achieved by means of the asynchronous machine 16 this is of no significance. The use of the capacitance has however the advantage that the compensating quantity will be affected by sub-harmonic and harmonic disturbances in the same manner as the zero error quantity.

The forms of the relay protection shown in FIGS. 3 and 4 can also be used at multiphase shunt capacitor banks consisting of only one star-connected multiphase system of capacitor elements, because the other multiphase system may be formed by other impedances if desired.

We claim as our invention:

1. A capacitor bank adapted to be connected to an alternating current power line, said capacitor bank including two similar parallel branches, each of said branches comprising a plurality of series-connected groups and each group comprising a plurality of capacitor units connected in parallel, means for connecting the capacitor bank to said power line, a transformer connected between corresponding points on said branches, the impedances of said branches being different and an unbalance current normally flowing between said points, whereby an alternating current signal is developed by said transformer, phase shifting and magnitude varying means for deriving an alternating current signal equal in magnitude and opposite in phase to said signal developed by said transformer, means for vectorially adding said derived signal and said signal developed by said transformer, and relay means energized from the output of said last-named means.

2. A capacitor bank as claimed in claim 1; said capacitor bank being a single phase capacitor bank; a current transformer connected to said phase shifting and magnitude varying means for supplying power thereto; said current transformer being connected in series with said single phase capacitor bank.

3. A capacitor bank as claimed in claim 1; said capacitor bank being a single phase capacitor bank; a voltage transformer connected to said phase shifting and magnitude varying means for supplying power thereto; said voltage transformer being connected in parallel with said single phase capacitor bank.

4. A capacitor bank as claimed in claim 3, the primary winding of said voltage transformer forming a discharging reactor for said single phase capacitor bank.

5. A capacitor bank as claimed in claim 1; a second transformer connected to said phase shifting and magnitude varying means for supplying power thereto; said second transformer being connected to said alternating current power line.

6. A capacitor bank as claimed in claim 5; said alternating current power line being a multiphase A.C. line; said capacitor bank being a multi-phase capacitor bank with the same phase number as said A.C. line; said second transformer being a two-phase transformer; each phase of said two-phase transformer being connected on its primary side to its own pair of phases of said multiphase A.C. line; said phase shifting and magnitude varying means comprising magnitude varying means in each phase of the secondary side of said two-phase transformer and means for deriving the geometric sum of the secondary phase voltages of said two-phase transformer.

7. A capacitor bank as claimed in claim 5; said alternating current power line being a multiphase A.C. line; said capacitor bank being a multi-phase capacitor bank with the same phase number as said A.C. line; said second transformer being a two-phase transformer; each phase of said two-phase transformer being connected on its primary side to its own pair of phases of said multiphase A.C. line; said phase shifting and magnitude varying means comprising an induction regulator connected to said two-phase transformer and provided with a voltage divider on its secondary side.

References Cited in the file of this patent

UNITED STATES PATENTS 2,931,950    Minder _____ Aug. 5, 1960

FOREIGN PATENTS 127,734    Austria _____ Apr. 11, 1932
82,856    Norway _____ Dec. 7, 1953